United States Patent [19]

Hegyi

[11] Patent Number: 4,933,550

[45] Date of Patent: Jun. 12, 1990

[54] PHOTODETECTOR SYSTEM WITH CONTROLLABLE POSITION-DEPENDENT SENSITIVITY

[76] Inventor: Dennis J. Hegyi, 1708 Morton Ave., Ann Arbor, Mich. 48104

[21] Appl. No.: 220,021

[22] Filed: Jul. 15, 1988

[51] Int. Cl.$^5$ ............................ H01J 5/02; H01J 5/16
[52] U.S. Cl. ............................ 250/237 R; 250/239; 250/203.1; 356/152
[58] Field of Search ............ 250/203 R, 203 S, 216, 250/237 R, 239; 165/28, 42; 236/91 F; 237/2 A, 5; 356/141, 152

[56] References Cited

U.S. PATENT DOCUMENTS

| | | | |
|---|---|---|---|
| 2,631,247 | 3/1953 | Shaw | 250/239 |
| 3,271,577 | 9/1966 | Miller et al. | 250/237 R |
| 3,315,084 | 4/1967 | Bertram | 250/239 |
| 4,459,022 | 7/1984 | Morey | 356/152 |
| 4,611,914 | 9/1986 | Homma | 356/152 |
| 4,618,259 | 10/1986 | Czichy et al. | 356/152 |
| 4,625,108 | 11/1986 | Nestel et al. | 356/152 |
| 4,760,772 | 8/1988 | Horiguchi et al. | 165/28 |

Primary Examiner—Edward P. Westin
Attorney, Agent, or Firm—Rohm & Monsanto

[57] ABSTRACT

A photodetector system for producing electrical signals responsive to the orientation of a light source, such as the sun, with respect thereto utilizes a diffuser to eliminate position-dependent sensitivities of the photocathode. The extent to which the diffuser or the photocathode itself is exposed to the incident radiation can be controlled by a shroud or by applying an absorptive coating in a predetermined pattern on an absorber cap, or on the diffuser directly. The shroud, by its configuration and its height above the photodetector, defines the range of angles of elevation and azimuth at which the diffuser can be illuminated. Such angles can also be controlled with printed or sprayed-on markings on the diffuser or absorber cover which form an opaque coating so as to prevent light transmission over predetermined regions. A fine dot pattern may be applied to the diffuser or the absorber cover, so that only partial transmission of the light can be achieved therethrough. The absorber cover may be provided with a light absorbing coloration or dye therethrough, and have a predetermined variation in thickness, so that the amount of light transmitted therethrough is responsive to the thickness at the point of incidence of the light.

11 Claims, 2 Drawing Sheets

PHOTODETECTOR SYSTEM WITH CONTROLLABLE POSITION-DEPENDENT SENSITIVITY

BACKGROUND OF THE INVENTION

This invention relates generally to photodetector systems, and more particularly, to a photodetector system wherein the electrical output signal is responsive to the position of a light source with respect to the photodetector.

There is available in the prior art a large variety of systems for producing electrical signals having information content responsive to the orientation of a light source, such as the sun, relative to a photodetector. Most of the known arrangements for performing this function are complex and expensive, and also are rather bulky with their asssociated electronic signal analysis systems. One known arrangement utilizes a pair of solar cells arranged orthogonal to one another. The incident electromagnetic radiation, or sunlight, causes the solar detectors to generate respective output electrical signals having amplitudes responsive to the angle of incidence of the light. Ratio detecting circuitry is used to determine the angle of incidence with respect to the orientation of the solar detectors, by monitoring and comparing the output signals of the respective solar detectors.

A further known system for determining the direction of incident radiation utilizes a sensor head having a hemispherical convex surface area on which are terminated a plurality of optical fibers. The optical fibers are bundled and terminated at their distal ends with detectors, which are arrayed illustratively in the form of matrix. This known system, however, in addition to requiring a multiplicity of detectors arranged in a matrix, also requires complex mathematical and evaluation circuitry which render this known system unsuitable in applications where simplicity and economy are required.

Particularly in mobile systems which continually are changing their orientation with respect to the sn, it is desirable to modify the output of associated heating and cooling systems so as to take into consideration the effects of sunlight. In such systems, however, there is not often available space for a complex, multi-component sensor and associated computation circuitry. There is therefore a need for a sensor which is responsive to the position of a light source, and which also is compact and reliable.

It is, therefore, an object of this invention to provide a system for monitoring the position of a light source, the system being simple and inexpensive.

It is another object of this invention to provide a system for monitoring the position of a light source wherein only one detector is required to achieve the monitoring function.

It is also an object of this invention to provide a system for monitoring the position of a light source wherein the need for multi-detector comparator circuitry is avoided.

It is a further object of this invention to provide a system for monitoring the position of a light source wherein an output electrical signal is responsive to an angle of elevation of the light source with respect to a predetermined horizon.

It is additionally an object of this inventon to provide a system for monitoring the position of a light source wherein an output electrical signal is responsive to a predetermined azimuth angle.

It is yet a further object of this invention to provide a system for monitoring the position of a light source wherein there is not a need for fiber optic elements for directing the light to be monitored to a detector.

It is also another object of this invention to provide a system for monitoring the position of a light source wherein a high degree of compactness is achieved.

It is yet an additional object of this invention to provide a system for monitoring the position of a light source, the system being particularly suited for mobile applications.

It is still another object of this invention to provide an arrangement for controlling a mobile cooling system in response to incident sunlight being within a predetermined range of angles of elevation.

It is yet a further object of this invention to provide an arrangement for controlling a mobile cooling system in response to incident sunlight being within a predetermined range of angles of azimuth.

It is also a further object of this invention to provide an arrangement for controlling a mobile cooling system in response to the angle of incidence of sunlight.

SUMMARY OF THE INVENTION

The foregoing and other objects are achieved by this invention which provides a photodetector arrangement for producing an electrical signal which is responsive to the position of a source of light with respect thereto. In embodiments of the invention applied to control the cooling/heating, or air conditioning, systems of a vehicle, the source of light of interest is the sun, in view of the heat generated thereby, such that the cooling capacity of the air-conditioner is controlled in response to the angle of incidence of the sunlight. In accordance with the invention, a photodetector having an input for receiving the input light and an output terminal for isssuing an electrical signal responsive to the input light is provided with a light modulator arranged in the vicinity of the input. The light modulator determines a position-responsive sensitivity characteristic of the photodetector system, such that the output electrical signal of the photodetector is responsive to the position of the source of the input light.

In one highly advantageously embodiment of the invention, a diffuser is installed optically intermediate of the photodetector and the light modulator. The diffuser, although not necessary to the practice of the invention, serves to scatter the light impinging upon the photodetector and thereby diminish the effect of position-dependent characteristics of the light-sensitive area of the photodetector. More specifically, most photodetectors have light sensitive areas called photocathodes which ideally should be uniformly sensitive to light. However, photocathodes have a sensitivity to light which is a function of the location on the photocathode which is being illuminated. Thus, when a light beam moves across a typical photocathode, the output electrical signal from the photodetector varies, not because the intensity of the incident light beam changes, but rather because the light beam moves across portions of photocathode with different sensitivities to light. The diffuser, since it is arranged to cover the photodetector, diminishes the position-dependent characteristic of the photocathode of the photodetector by scattering the light and averaging the error out substantially over the entire surface.

In accordance with a specific illustrative embodiment of the invention, the light modulator is configured in the form of a shroud which is installed over the diffuser to occlude all but a predetermined portion of the input of the photodetector. In this manner, only light which is propagated over a predetermined range of angles of incidence is permitted to impinge upon the diffuser, and therefore the output electrical signal of the photodetector is responsive to light which is received at an angle of incidence which is within this predetermined range.

In other embodiments of the invention, the light modulator is formed of one or more markings which are applied directly to the diffuser, illustratively by printing. In addition to a pattern of marks which absorbs all light incident upon the device, a pattern of marks, such as a very fine dot pattern, may be used to control partial transmission of the incident light, in a manner analogous to the production of half-tones in printed media.

In accordance with a further specific illustrative embodiment of the invention a cooling system control element, which may be used to control the output of the air-conditioner of a vehicle, is mounted at a location on the vehicle which is subjected to sunlight, and at a predetermined orientation with respect to the vehicle. A photodetector, as described hereinabove, has associated therewith a light modulator which controls the magnitude of the sunlight which is incident upon the input of the photodetector.

In certain embodiments of this cooling system control element aspect of the invention, the light modulator blocks the sunlight from reaching the input of the photodetector, except over a predetermined range of angles of incidence. The predetermined range of angles of incidence may include predetermined angles of elevation and angles of azimuth. In addition, the light modulator need not block the sunlight totally, but may merely impede same whereby partial transmission of the sunlight is permitted. Thus, the present invention is not limited to transmissive and non transmissive ranges of angles of incidence, but may also include partial transmission.

There are a number of issues which should be taken into consideration when designing a solar sensor for an automobile so that it will achieve the desired response function to the sunlight as a function of the elevation and azimuth of the sun. The central idea in the modeling is to determine the effectiveness with which the sun heats the passenger compartment of an automobile as a function of its position in the sky relative to the automobile. The solar sensor should be less responsive to sunlight for those solar angles where some part of the automobile is interfering with the passage of sunlight into the vehicle. More specifically, the solar sensor should be less responsive when the sun is directly overhead because the roof of the automobile shields the passenger compartment. On the other hand, when the sun is shining directly into the windshield, the solar sensor should be more responsive.

An illustrative solar sensor embodiment of the invention has three basic elements: an absorber which could be in the form of a shroud, a diffuser (optional), and a photodetector. One approach to designing such a solar sensor takes employs a hemispherically shaped diffuser. This shape is set forth herein for convenience in the following analysis, but it is understood that numerous other shapes can be employed without departing from the scope of the claimed invention. With the diffuser installed on the dashboard of a vehicle, as viewed from above, the diffuser appears as a circle, i.e., the projection of the diffuser is a circle. However, when viewed from the side (horizon), it appears as a semicircle.

It is the total amount of light which strikes a diffuser that determines the output signal from the photodetector. In other words, since it is the projection of the diffuser along the direction of the sunlight which is important, the sun directly overhead strikes twice the area of the diffuser generating twice the response as when the sun is on the horizon.

When considering the shape of the absorber or shroud which is to be installed over the diffuser, it is important to consider and determine its distance from the diffuser for each position of the sun. Consideration is then given to the intersection of each ray of sunlight incident on the diffuser. Either by having some number of rays strike a shroud, or equivalently, having some fraction of the rays absorbed by an absorber, it is within the capabilities of persons of ordinary skill in the art, in view of the teaching herein, to design the shroud or absorber to obtain the desired angular response function. The final design must be found in an iterative way because the existence of a shroud or absorber affects the number of rays that will be absorbed at more than one solar angle.

The method, or approach, described immediately hereinabove for designing a solar detector produces surprisingly excellent flexibility. In fact, for a diffuser which is small compare to the size of the absorber or shroud, for a single position of the sun, the path that the sunlight which strikes the diffuser takes through the absorber, or that is incident on the shroud, only strikes a small element of the absorber or shroud. Thus, in this situation, each element of the shroud or absorber is independent of all other elements and the design is particularly simple since it requires no iteration. Each element of the absorber or shroud corresponds to a single position of the sun.

BRIEF DESCRIPTION OF THE DRAWING

Comprehension of the invention is facilitated by reading the following detailed description, in conjunction with the annexed drawing, in which.

DETAILED DESCRIPTION

Figure 1:
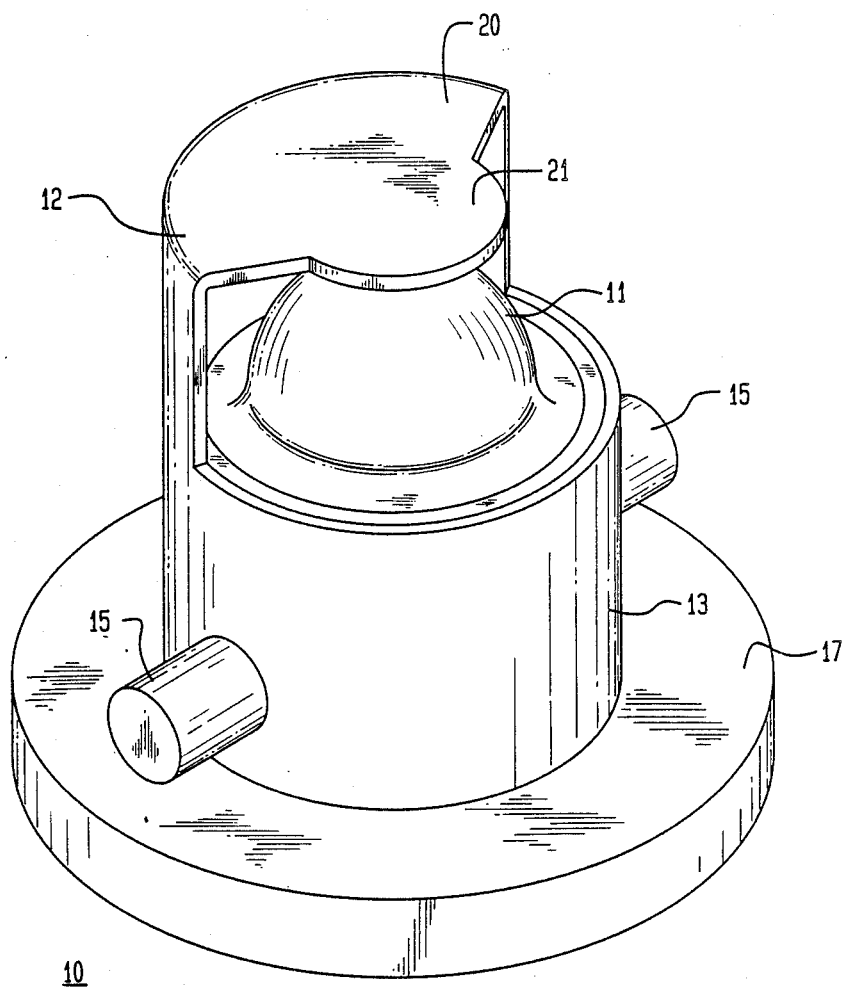
FIG. 1 is an isometric representation of a specific illustrative embodiment of the invention which employs a shroud for defining a range of angles of incident light which can impinge upon the photodetector.

FIG. 1 is an isometric representation of an embodiment of the invention wherein a photodetector system 10 is shown to have a diffuser element 11 which is installed in a shroud 12. In this embodiment, the shroud is formed integrally with a substantially cylindrical body 13 which has ears 15 extending therefrom for assisting in mounting and installation of the photodetector system onto a vehicle (not shown). In this specific embodiment, body 13 is affixed to a base number 17 which also facilitates mounting and installation.

As shown in this figure, shroud 12 is configured to have a top portion 20 which is configured to overlie diffuser element 11. In this specific embodiment, top portion 20 has an extension 21 which prevents light from source (not shown) directly over the photodetector system from impinging upon diffuser element 11. In this manner, shroud 12 with its respective side and top portions and extensions thereof defines a region through which diffuser element 11 can be exposed to light. The region of exposure can be defined in terms of a range of angles of elevation and a range of angles of azimuth.

Figure 2:
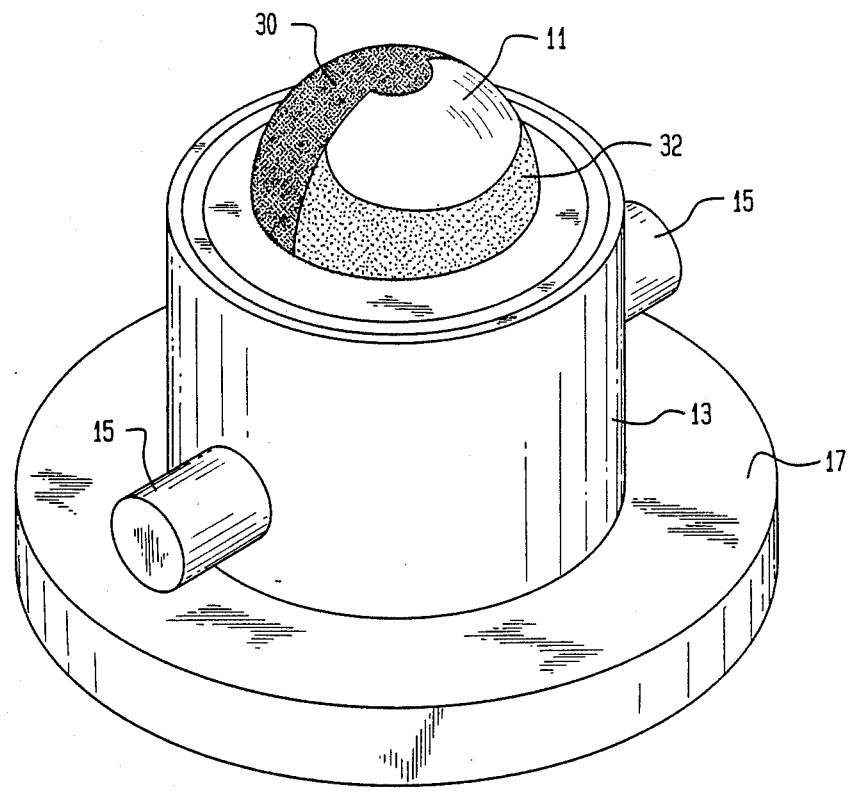
FIG. 2 is an isometric representation of a specific illustrative embodiment of the invention which employs a printed pattern on the diffuser element for defining a range of angles of incident light which can impinge upon the photodetector, and additionally a region of partial transmissivity of the light.

FIG. 2 is an isometric representation of a specific illustrative embodiment of the invention wherein elements of structure having analogous correspondence to those of FIG. 1 are similarly designated. In FIG. 2, diffuser element 11 is not covered by a shroud, as discussed hereinabove with respect to FIG. 1, but rather has printed thereon markings which define regions of desired exposure. More specifically, diffuser 11 in this specific embodiment has printed thereon opaque markings 30 over a predetermined region thereof which occlude the diffuser from any impinging light. The particular configuration of opaque markings 30 on the diffuser element can be adjusted by persons of skill in the art to meet necessary criteria.

The diffuser element is shown to have in FIG. 2 a further region of markings 32 which form a partially opaque region. Partially opaque region 32 may be formed by printing on diffuser 11 a multiplicity of very fine dots in a pattern analogous to conventional halftone printing. Persons of skill in the art can configure the dot density to achieve a desired level of light transmissivity.

Figure 3:
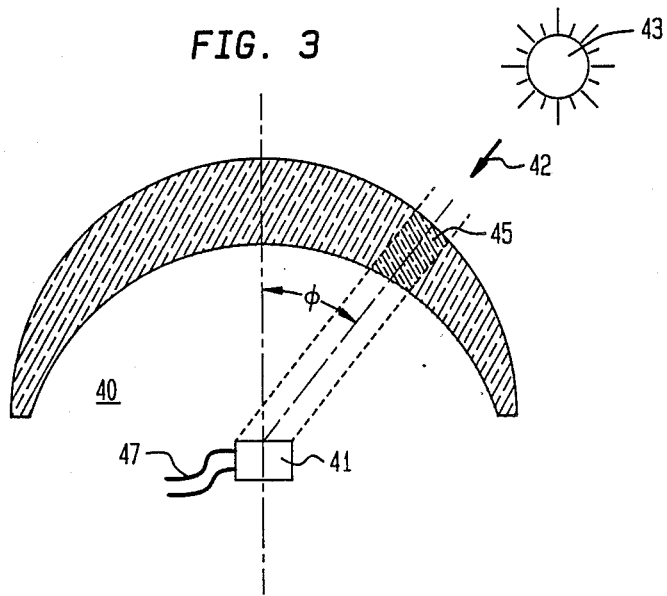
FIG. 3 is a cross-sectional representation of an embodiment of the invention wherein modulation of the impinging light is achieved as a function of absorber thickness.

FIG. 3 is a cross-sectional schematic representation of an absorber cap 40 which is arranged to overlie a photodetector 41. As shown in this figure, photodetector 41 receives an illumination which is generally designated by arrow 42 from a light source 43. Absorber cap 40 may be formed of a translucent, and preferably transparent, material which has a coloration added, such as a dye, whereby the amount of light which is transmitted there through is a function of the thickness of the cap. For purposes of the present discussion, light source 43 is assumed to be collimated, and may be the sun.

The path that the light radiation incident upon photodetector 41 takes through the walls of absorber cap 40 is illustrated by shaded area 45. Assuming a hemispherical absorber cap, the amount of light which reaches photodetector 41 can be correlated to the angle $\phi$. Thus the electrical signal which is produced at output leads 47 of the photodetector is responsive to this angle.

It is to be understood that the outer and/or inner surfaces of absorber cap 40 may be provided with printed markings or sprayed-on coating which achieves a desired transmission pattern therethrough. Moreover, persons of skill in the art can design the absorber cap and its associated variations in thickness to achieve a desired function, and also include within the design compensation for other effects, such as refraction.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A photodetector arrangement for producing an electrical signal responsive to the position of a source of light with respect to the photodetector arrangement, the photodetector arrangement comprising:

photodetector means having an input for receiving an input light from the source of light, and an output terminal for providing an output electrical signal responsive to said input light;

diffuser means arranged to overlie said input of said photodetector means so as to be intermediate of said input and the source of light, said diffuser means functioning to diffuse said light from the source of light prior to its impinging upon said input; and light modulator means arranged in the vicinity of said diffuser means distal from said input of said photodetector means so as to be intermediate of said diffuser means and the source of light for defining a spatial field in which the location of the source of light is desired to be ascertained and determining a position-responsive sensitivitiy characteristic of the photodetector arrangement within said spatial field, whereby said output electrical signal of said photodetector means is characterized by an amplitude which varies in response to variation in the position of the source of light within said spatial field.

2. The photodetector arrangement of claim 1 wherein said light modulator means comprises a substantially transparent cap member arranged to overlie said diffuser means, said cap member having a light absorptive coating over predetermined portions thereof, for producing said position-responsive characteristic of the photodetector arrangement.

3. The photodetector arrangement of claim 1 wherein said light modulator means comprises coating means applied to said diffuser means for occluding said light from the source of light from impinging upon said diffuser means in all but a predetermined portion of said diffuser means corresponding to said spatial field.

4. The photodetector arrangement of claim 3 wherein there is provided modulator coating means arranged to overlie at least a portion of said predetermined portion of said diffuser means for occluding said light from the source of light from impinging upon said portion of said predetermined portion of said diffuser means.

5. The photodetector arrangement of claim 1 wherein said light modulator means comprises shroud means installed for occluding all but a predetermined portion of said input of said photodetector means corresponding to said spatial field.

6. The photodetector arrangement of claim 1 wherein said light modulator means comprises a substantially transparent cap member arranged to overlie said diffuser means, said cap member having a light absorptive coloration therein, and having a thickness which varies over predetermined portions thereof for producing said position-responsive characteristic of the photodetector arrangement.

7. A cooling system control element for a vehicle for producing a control signal responsive to the direction of incidence of sunlight, the cooling system control element comprising:

mounting means for installing the cooling system control element on the vehicle in a predetermined orientation at a location which is subjected to sunlight;

photodetector means having an input for receiving the sunlight, and an output terminal for providing an output electrical signal responsive to the sunlight;

diffuser means arranged to overlie said input of said photodetector means so as to be intermediate of said input and the sunlight, said diffuser means functioning to diffuse said sunlight prior to its impinging upon said input; and light modulator means for controlling the incidence of the sunlight upon said diffuser means, whereby the control signal of the cooling system control element is responsive to variations in the direction of incidence of the sunlight.

8. The cooling system control element of claim 7 wherein said light modulator means comprises sunlight impeding means for permitting partial transmission of the sunlight upon said diffuser means over a further predetermined range of angles of incidence.

9. The cooling system control element of claim 7 wherein said light modulator means comprises sunlight blocking means for preventing the incidence of the sunlight upon said diffuser means except over a predetermined range of angles of incidence.

10. The cooling system control element of claim 9 wherein said predetermined range of angles of incidence of the sunlight include a predetermined range of angles of elevation.

11. The cooling system control element of claim 9 wherein said predetermined range of angles of incidence of the sunlight include a predetermined range of angles of azimuth.

* * * * *